United States Patent [19]

Lazzati

[11] Patent Number: 4,641,938
[45] Date of Patent: Feb. 10, 1987

[54] PHOTOGRAPHIC SHUTTER OF THE FOCAL-PLANE TYPE

[75] Inventor: Jean P. Lazzati, Franconville, France

[73] Assignee: U.S. Philips Corporation, New York, N.Y.

[21] Appl. No.: 776,092

[22] Filed: Sep. 16, 1985

Related U.S. Application Data

[63] Continuation of Ser. No. 707,533, Mar. 4, 1985, which is a continuation of Ser. No. 507,405, Jun. 24, 1983.

[30] Foreign Application Priority Data

Jul. 9, 1982 [FR] France .................................. 82 12138

[51] Int. Cl.[4] .............................................. G03B 9/34
[52] U.S. Cl. ..................................................... 354/243
[58] Field of Search .................. 354/65, 241, 242, 243, 354/244

[56] References Cited

U.S. PATENT DOCUMENTS 2,218,248 10/1940 Mihalyi ................................ 354/244
2,335,690 11/1943 Morse .................................. 354/244
2,446,638  8/1948 Cromrine ............................. 354/243
3,554,106  1/1971 Baumgurten ......................... 354/243
3,577,901  5/1971 Gray .................................... 354/243
3,739,704  6/1973 Akiyama .............................. 354/243
3,744,392  7/1973 Dahlgren et al. ..................... 354/243

Primary Examiner—Russell E. Adams
Attorney, Agent, or Firm—David R. Treacy; Joseph P. Abate

[57] ABSTRACT

The shutter comprises a first and a second blind (47, 48) extending in parallel planes close to each other and wound on at least one roller (6, 9) on each side of the exposure window, which blinds each have an edge (55, 56) which edges define a shutter slit (5) between them. The roller of the first blind is driven by a first pinion (7) which is rigidly coupled to a drive mechanism (31). In accordance with the invention the shutter comprises a second pinion (11) which is rotationally coupled to the first pinion, and a third pinion (14) which is coaxial with the second pinion and which is driven by the second pinion via an angular-positioning device (59) which drives the roller (9) of the second blind; the shutter also comprises tension means (49, 52, 53) which maintain each blind in its respective plane. In this way an accurately variable width of the shutter slit can be obtained.

The shutter is used in cameras for aerial or marine surveillance.

13 Claims, 5 Drawing Figures

PHOTOGRAPHIC SHUTTER OF THE FOCAL-PLANE TYPE

This is a continuation of application Ser. No. 707,533, filed Mar. 4, 1985, which was a continuation of Ser. No. 507,405, filed June 24, 1983.

The invention relates to a photographic shutter of the focal-plane type, comprising a first and a second blind which extend in parallel planes close to each other and which are each partly wound on at least one drive roller which is situated on one side and on the other side of the exposure window respectively and which is mounted, for rotation on a chassis, which blinds each comprise at least one edge which is movable across the exposure window in such a way that a shutter slit is formed between said edges, the roller of the first blind being driven directly by a first pinion which is rotatably coupled to a drive mechanism mounted on said chassis.

The focal-plane shutter in accordance with the invention may be used in all types of photographic cameras, which may be normal commercially available cameras or more specialized cameras such as those used for aerial or marine surveillance.

Shutters comprising two blinds are known, for example from French Patent Application No. 2.439.413. This prior-art shutter has the advantage that for a constant travelling speed $v(t)$ of each blind it provides a slit width d and thus an exposure time T which can be adjusted, the following relationship being valid:

$$d = vT \qquad (1)$$

This is an improvement in comparison with certain cameras comprising a single blind with a fixed slit width, in which the exposure time is varied by replacing the blind by another blind having a slit of a different width, or in comparison with conventional commercially available cameras having a shutter blind without slit which upon its release returns to its closed position after a predetermined time. This last-mentioned method does not provide a wide exposure-time control range in contradistinction to the method employing shutters with two blinds. On the other hand, in the case of a shutter comprising one or more blinds whose shutter slit travels across the image to be exposed and whose exposure time T complies with the above equation (1), it is attempted to make the parameters d and v constant as a function of time, so as to obtain a constant exposure time T during the translational movement of the blind(s). This is difficult to accomplish when high speeds v are required because of the inevitable acceleration and deceleration of the shutter parts to be rotated or translated. One solution to this technical problem is to make the instantaneous values of the parameters d and v proportional by various known means, i.e. to ensure that the following relationship is valid during operation of the shutter:

$$d(t) = K\, v(t) \qquad (2)$$

K being a constant in first approximation. Nevertheless, it is difficult to ensure that such a relationship is complied with precisely. The shutter comprising two blinds described in French Patent Specification No. 2.439.413 has two disadvantages: the movements of the two blinds are independent, whereas their speeds $v(t)$, which vary as a function of time, are substantially equal. It follows that for a great slit width this width varies during the translational movement of the slit, which variation may change even to a different extent for each of the blinds. On the other hand, for very small slit widths of the order of 1 to 2 mm, i.e. very short exposure times, the accuracy of the system deteriorates because of the high relative error to which the width d is the subject.

In principle, it is the object of the invention to provide a shutter whose slit width is accurately variable, whilst permitting high speeds of operation.

This object is achieved and the drawbacks of the prior art are mitigated or eliminated when the photographic shutter defined in the opening paragraph is characterized by a mechanical connection between said drive rollers such that at any instant a relative position of the blinds can be obtained which defines a shutter slit of predetermined width, said blinds being tensioned permanently, which shutter, for this purpose, comprises a second pinion which is mounted for rotation on said chassis which second pinion is arranged opposite the first pinion on the other side of the exposure window and is rotatably coupled to said first pinion, a third pinion which is coaxial with the second pinion and which is driven by said second pinion via an angular-positioning device which is independent of the simultaneous rotary movements of the second and the third pinion, said third pinion driving said drive roller of said second blind with the same speed of rotation as the drive roller of the first blind, and tension means which maintain each blind in its respective plane. The basic idea of the invention is to interlock the translational movements of the two blinds, preferably by mechanical means, in such a way that the slit width can have, for example, a fixed value or varies in accordance with a predetermined function while the blinds travel across the image to be exposed.

In a preferred embodiment said tension means comprise, for the first blind, a third drive roller which is mounted for rotation on the chassis and which is rotated by said second pinion and, for the second blind, a fourth roller which is mounted for rotation on the chassis near said drive mechanism and which is driven by a tension band which is wound around the rollers carrying the second blind with winding directions opposite to those of the second blind, and said first and second blinds each have a rectangular aperture which is capable of exposing the entire format, one of the small sides of said aperture forming an edge of the shutter slit.

In another preferred embodiment, which is compatible with the foregoing embodiment, said drive mechanism is a helical spring with non-adjoining turns, which spring may be loaded in torsion in both directions of rotation, the shutter being characterized in that the angular positioning device comprises a combination of a first and a second concentrically arranged drum, which drums are mounted for rotation on said chassis, a spindle, and at least one limb, which first drum is rigidly connected to said second pinion and which second drum is rigidly connected to said third pinion, said spindle being coaxial with said second and third pinions in which it can slide freely, said limb being mounted for rotation so that it cannot be translated on said spindle inside said drums and engaging a first and a second curved slot formed in the walls of the first and the second drum, respectively, which slots are curved oppositely, the angular displacement between said second and third pinions being a function of the translational position of said spindle along its axis.

Another preferred embodiment of the invention, which is compatible with the preceding embodiments, is characterized in that said second drum is longer than said first drum and its slot extends further than said first drum in accordance with a generatrix of the cylinder formed by the drum in such a way that for a range of values corresponding to a deep insertion of said spindle in the drums said limb is disengaged from said first slot so that the two drums are not coupled to each other.

This last-mentioned embodiment enables exposures to be made by means of only one of the two blinds, so that no shutter slit is formed and the image format remaining exposed throughout the selected exposure time.

Embodiments of the invention will now be described in more detail, by way of example, with reference to the drawings.

In the various Figures elements having the same functions bear the same reference numerals.

Figure 1:
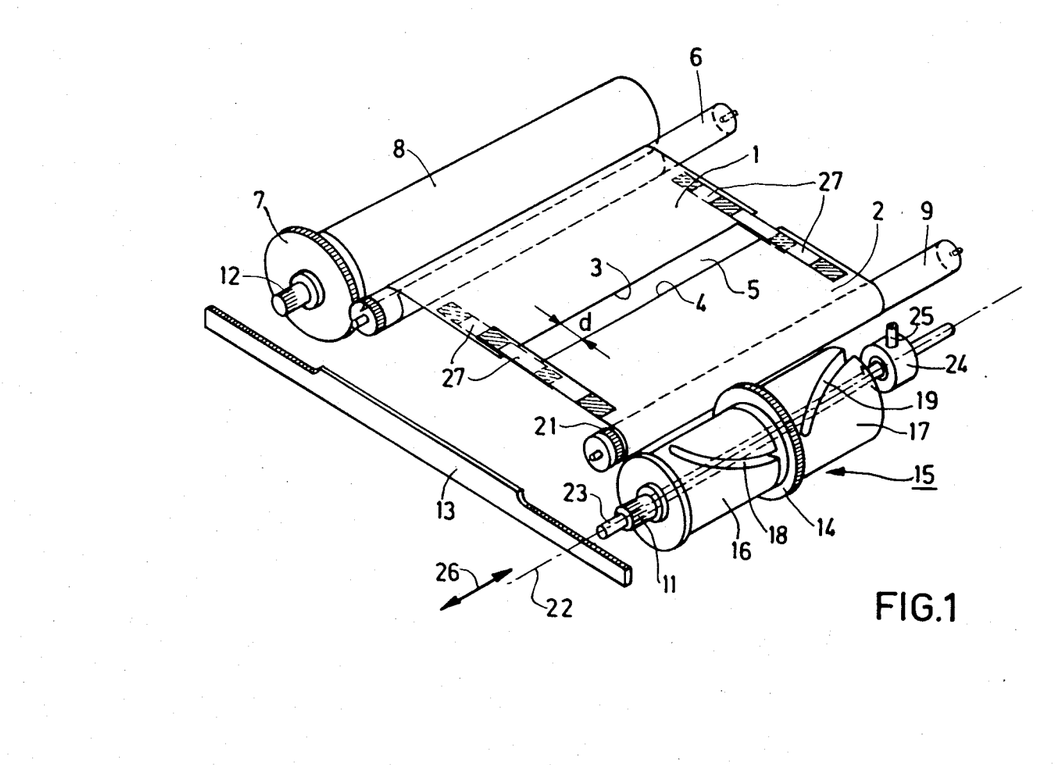
FIG. 1 is a, partly exploded, view of a simplified embodiment of the shutter in accordance with the invention.
Figure 2:
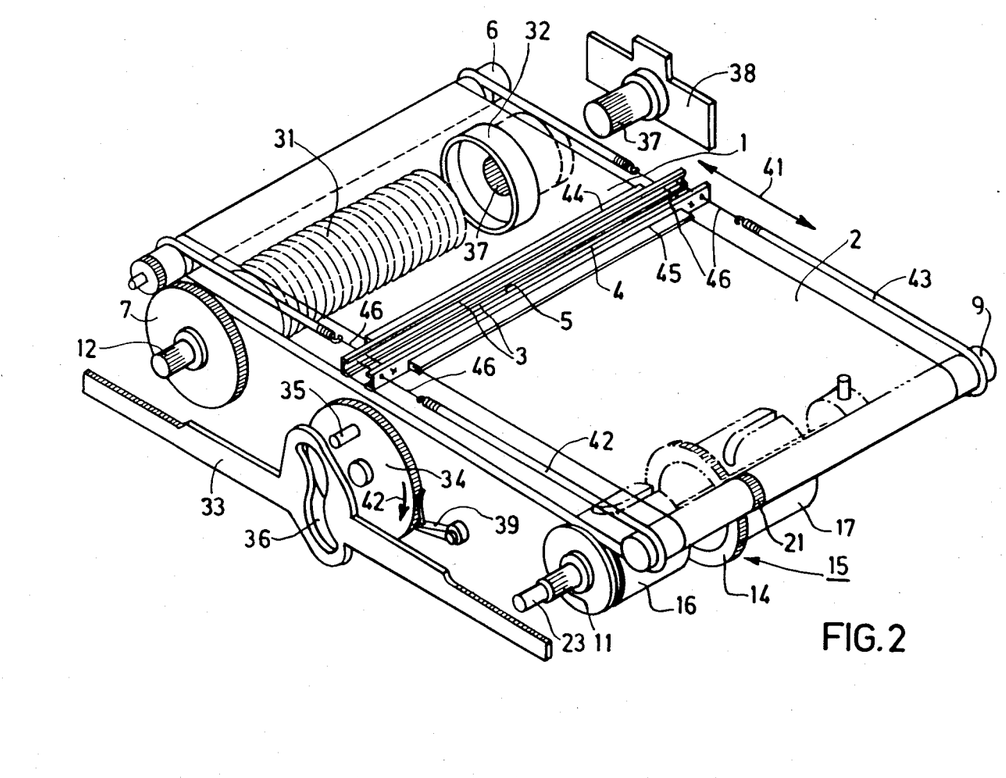
FIG. 2 is a partly exploded view of a more elaborate embodiment of a shutter in accordance with the invention.
Figure 3:
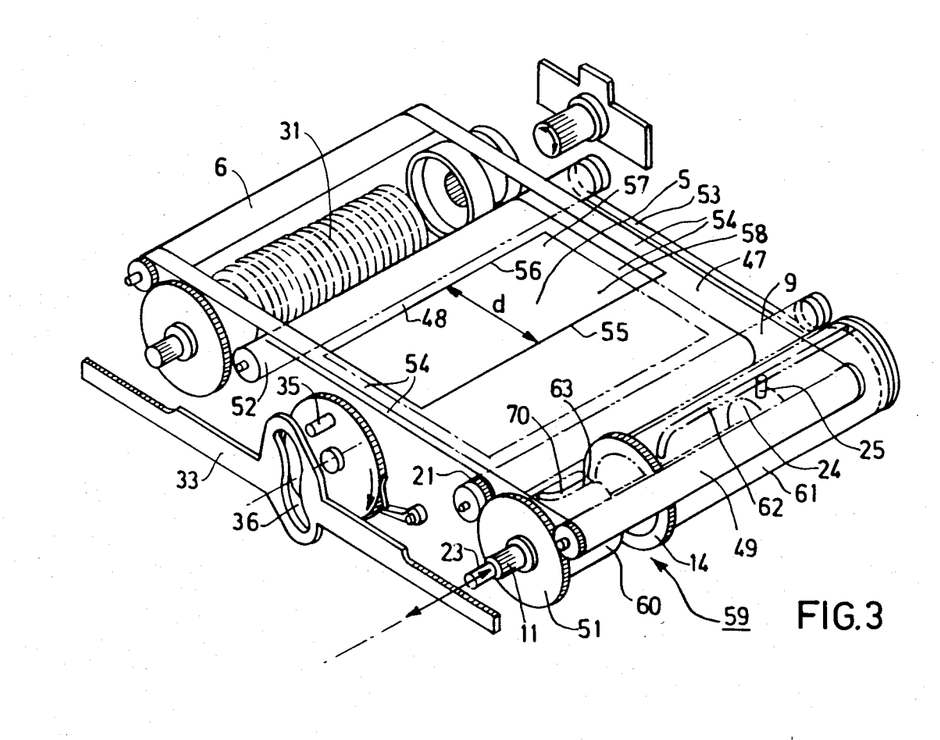
FIG. 3 is a partly exploded view of an elaborate embodiment of the shutter in accordance with the invention.

In FIGS. 1 to 3 the chassis which carries the various parts of the shutter is not shown for the sake of clarity. The shutter shown in FIG. 1 comprises a first blind 1 and a second blind 2 which extend substantially in the same plane or in parallel planes close to each other and each comprise an edge, 3 and 4 respectively, which can move across the exposure window (not shown) in such a way that a shutter slit 5 having a width d is formed between the edges 3 and 4. Each blind is partly wound on a drive roller, which rollers are each situated on one side of the exposure window, the blind 1 being wound on a roller 6 which is driven directly by a first pinion 7, which is rotated by a drive mechanism 8 which is rigidly connected to the chassis, and the shutter 2 is wound on a roller 9. In accordance with the invention the two blinds are mechanically interlocked permanently, i.e. no matter whether the shutter is operative or inoperative, and the width of the slit 5 can be varied at any instant, the blinds 1 and 2 remaining always taut. Inoorder to achieve this, the shutter firstly comprises a second pinion 11, which is arranged opposite the first pinion 7 on the other side of the exposure window and which is rotatably coupled to said first pinion, for example by means of a pinion 12, which is rigidly connected to the pinion 7, and a gear rack 13; the shutter also comprises a third pinion 14 which is coaxial with the pinion 11 and which is driven by the latter via an angular-positioning device 15 which is independent of the simultaneous rotary movement of the pinions 11 and 14; finally, the shutter comprises tension means which ensure that each shutter remains taut in its plane.

In a manner, not shown, the gear rack 13 can be translated on rollers which are provided with flat-bottom grooves and which are mounted for rotation on the chassis, the two toothed end portions of the gear rack being in engagement with the pinions 11 and 12. The angular-positioning device 15 comprises two cylindrical drums, of which the drum 16 is rigidly connected to the pinion 11 and of which the drum 17 is rigidly connected to the pinion 14. In each drum wall a curved slot 18, 19 is formed, for example, a helical slot with opposite curvatures. During assembly of the shutter the drums are inserted one into the other so that they can rotate freely in each other, for example in the same way as a sleeve bearing or by means of roller bearings, and the pinion 14 is then in mesh with the drive pinion 21 of the roller 9. After assembly the pinions 11 and 14 as well as the drums 16 and 17 have a common axis 22. The assembly comprising the elements 11, 14, 16 and 17 is supported on the chassis by means of two bearings, not shown, one bearing at the location of the pinion 11 and one bearing at the end of the drum 17 which is remote from the pinion 14. The journal of the pinion 11 has a bore for the passage of a spindle 23 which has an axis 22. The spindle 23 can perform free translational and rotational movements inside the drums and a member 24, which is located inside the drums and which comprises at least one limb 25, is mounted on said spindle so that it can rotate but cannot be translated (for example by means of a bearing whose inner race is clamped on the spindle 23). The limb 25 engages in the slots 18 and 19. Preferably, the angular-positioning device described in the foregoing comprises two further slots such as 18 and 19 and comprises a further limb such as 25, which elements are disposed mirror-symmetrically relative to the axis 22 in order to balance the mechanical stresses occurring during operation of the device. Alternatively, there may be provided 2 times three slots and three limbs which are disposed at 120° from each other around the axis 22.

When the limbs, such as 25, are simultaneously in engagement with the slots such as 18 and 19 a translation of the spindle 23 gives rise to a corresponding angular displacement between the pinions 11 and 14, thus establishing a special geometrical relationship between the respective points of the slots such as 18 and 19 which are situated in one plane perpendicular to the axis 22 by means of the limbs such as 25, said angular displacement having the same predetermined value, whilst the pinions 11 and 14 which are rotatably coupled to each other via the limbs 25 rotate until they are stopped, i.e. during exposure or between two exposures. If x is the variable which represents the displacement of the spindle 23 along the axis 22, this results in a continuous function d(x) for the slit width which can be varied as desired independently of the movement and the translational positions of the blinds 1 and 2, provided that the reduction ratios between the motor pinion 7 and each of the drive rollers 6 and 9 is the same by choosing a suitable construction. A shaft in rotary position between the pinions 11 and 14 therefore results in a corresponding proportional variation of the width d of the slit, which can thus be made very small. It is to be noted that once the slit width has been adjusted by the translational position of the spindle 23 as indicated by the double arrow 16 it is irrelevant for the control of the slit as described in the foregoing whether the spindle 23 is rotated (through friction inside the pinion 11) or is maintained stationary in that it slides over a part of the chassis, so that no rotation is possible, because the member 24 is mounted for rotation around the spindle 23. Preferably, the spindle 23 cannot rotate relative to the chassis and its translational position (arrow 26) is defined by means of a threaded bush which is mounted for rotation on the chassis, for example by means of a bearing and which is fitted onto a threaded end portion of the spindle 23. The means for actuating the spindle 23 are not shown in FIG. 1. For more details on the angular-positioning device reference is made to FIG. 5 and the corresponding part of the description. In order to ensure that the shutters remain taut and flat for all possible slit widths, there are provided tension means. In FIG. 1 these tension means comprise bands 27 of a thin elastic material which are disposed perpendicularly to the rollers 6 and 9 near the shutter edges which are perpendicular to the edges 3 and 4 of the slit. The ends of each of the four bands are secured to the shutters by a known means, one of the ends being situated very close to an edge of the slit and the other end being in a backward position relative to the opposite edge of the slit on the other shutter, which permits a large elongation of the elastic bands for all the desired slit widths. The bands are arranged in sets of two and they are arranged above each other on both sides of the shutters, for example symmetrically relative to the axis which indicates the centre of the slit, as shown in the Figure. The drive mechanism 8 comprises, for example, an electronically controlled electric motor which is mounted on the chassis, by means of which motor the desired speed characteristics and sequences for the shutter operation can be obtained, which operation can be obtained for either direction of travel of the slit 5 relative to the shutter window. Alternatively, the drive mechanism may comprise a helical spring, preferably having non-adjoining turns as shown in FIGS. 2 and 3, so that high torques and consequently high speeds can be obtained for the movable parts of the shutter. In this last-mentioned case a sequencing and energy supply mechanism must be used in conjunction with the drive mechanism for example as described with reference to FIGS. 2 and 3 hereinafter. It is to be noted that the drive rollers 6 and 9 provide a positive drive for the blinds 1 and 2 in both directions of rotation, such that the tension means, such as the bands 27 in FIG. 1, only have to overcome the inertia of the blinds, which is negligible relative to that of in particular the rotating parts, during the acceleration or deceleration phase by which each shutter release is attended.

FIG. 2 shows an embodiment of the shutter in accordance with the invention in which the drive mechanism comprises helical spring have non-adjoining turns 31, in conjunction with a sequencing (release) and energy supply or take-off mechanism, and in which the blind-tension means differ from the elastic bands 27 in FIG. 1. In FIG. 2 the angular-positioning device is similar to that shown in FIG. 1 and operates in the same way, the drive pinion 21 of the roller 9 being shown symbolically against the pinion 24 because the angular-positioning device is shown in an exploded view. One of the ends of the actuating spring 31 is secured to an annular member 32 and its other end to the motor pinion 7. A gear rack 33 is driven by the pinion 12 or by a pinion 34 which is coupled to an electric motor, not shown, via an eccentric pin 35 which engages with a slight clearance in a slot 36 formed in the gear rack 33 and which extends substantially perpendicularly to said rack. The annular member 32, which is connected to one end of the spring, cooperates, via splines 37, with a spring-balancing member 38 which is fixed to the chassis. In a manner not shown the rollers 6 and 9 and the pinions 12, 11 and 14 as well as the pinion 34, which comprises a non-return pawl 39, are supported by bearings mounted on the chassis, in the same way as in FIG. 1. The gear rack 33 is translated on rollers, not shown, having a flat-bottom groove for its guidance, on one side after gear rack being in contact with said rollers and the other side engaging with the pinions 11 and 12.

In both directions indicated by the double arrow 41 the shutter operates with energy regeneration as explained hereinafter. The force exerted by the spring for a specific position of the assembly comprising the blinds and the slit between said blinds is controlled by means of the spring-balancing member, in such a way that when the pin 35 is disposed at one end of the slot 36, the gear rack being substantially in its centre position, the actuating spring is in the rest position. The spring 31, which has non-adjoining turns, may be loaded in both directions, i.e. in the direction in which the turns expand (which is accompanied by slight elongation) or in the direction in which the turns contract (which is accompanied by a slight reduction in length). The variation of the length of the spring is possible a result of the splines 37. For example, when the pin 35 is in its upper position the pinion 34 is rotated in the direction of the arrow 42 until the pin is situated in the centre of the slot 36. At this instant the spring is wound up to the maximum extent, the gear rack is situated at the extreme right in the Figure, and the slit 5 is also disposed at the extreme right outside the camera format. After the passage of this extreme point of the pin the pinion 7 provides the drive under the influence of the spring, whilst for example a freewheel is provided for the pinion 34 in the direction of the arrow 42. During this very rapid movement of all the movable parts, the slit scans the image to be recorded and passes across the format in the other direction, the inertia of all the moving parts partly winding the spring in a direction opposite to that indicated in the foregoing. This winding of the spring is only partial because of the friction losses. The (oscillatory) return of the movable system to the rest position (spring not loaded) is prevented by the provision of the non-return pawl 39. The electric motor which rotates the pinion 34 may stopped during the rapid movement of the blind. Alternatively, it may rotate permanently, its number of resolutions determining the exposure rhythm and the shutter slit scanning consecutive images alternately in the one and the other direction. In a preferred embodiment the pinion 34 may be supported by a bearing which is rigidly connected to the chassis and the electric motor, which is not coupled to said pinion, comprises a shaft provided with a cam which during every half revolution of the pinion 34 moves the pin 35 to its extreme position in the lateral direction. This variant is preferred because a dead time occurs between two consecutive movements of the blind, during which the motor is not loaded by the shutter mechanism, which enables it to be used for other functions, such as advancing the film relative to the exposure window for the next exposure. In this way a symmetrically operating device is obtained in which most part of the energy produced by the spring is recovered by the spring itself, so that the electric motor only has to deliver a small amount of energy in order to tension the spring to the maximum extent. The principal advantages of this method of driving the blinds are: a high speed of the blinds is obtained of the order of a few metres per second, a low power consumption and, for each exposure, a range of substantially constant speed during the travel of the slit across the format to be exposed.

In FIG. 2 the tension means comprise two elastic belts 42 and 43, preferably of circular cross-section, which are arranged in suitable grooves in the rollers 6 and 9 and which form close loops, the ends of the belts being attached to the edges 3 and 4 of the slit 5 so as to pull said edges towards each other. In order to reinforce the edges of the slit and a satisfactory attachment, these edges are the edges of the blinds (not visible in FIG. 2) are clamped in metal portions 44 and 45 (for example sections). Preferably, the metal portions 44 and 45 project from the blinds on both sides to provide free ends for attaching the belts 42 and 43, which suitably comprise helical springs of very small diameter. At its end each spring is provided with a wire or string 46 which extends through one of the metal portions and which is attached to the other metal portion. In order to prevent a return torque being exerted on the metal portions 44 and 45, which would affect the accuracy of the slit width d, the strings 46 must extend in the plane of the blinds 1 and 2, as far as this is possible. It is to be noted that in the embodiment shown in FIG. 2 the distance between the drive rollers 6 and 9 is greater than in the embodiment shown in FIG. 1. This is because the blind-tension means in FIG. 2 cannot be wound around the rollers 6 and 9 in contradistinction to the situation shown in FIG. 1; therefore, it is necessary that after each exposure the shutter slit is closed or is at least situated well outside the exposure format in order to preclude fogging of the film. The spaced arrangement of the rollers in FIG. 2 ensures that the film is protected against the penetration of stray-light through the shutter slit 5.

The embodiment shown in FIG. 3 comprises the same energy recovery and release mechanism as the embodiment in FIG. 2. However, the blind-tension means and the angularpositioning device differ from those shown in FIGS. 1 and 2. In the present case the blinds are not juxtaposed but are superimposed so that a first or upper blind 47 is obtained and a second or lower blind 48, which are arranged in parallel with each other with a clearance of approximately 1 mm underneath the upper blind in the Figure. Each blind is tautened in its plane in that it is supported and driven by two rollers, disposed on both sides of the film format, which rollers constitute the tension means; the first blind 47 is driven by the roller 6 and by a third roller 49 which is mounted for rotation on the chassis and which is rotated by the second pinion 11 via a pinion 51 which is rotatably coupled to the pinion 11, and the second blind 48 is driven by the second roller 9 and a fourth roller 52, which is mounted for rotation on the chassis near the drive mechanism and which is rotated via a tension band 53 which is wound around the second and fourth supporting rollers of the second blind 58 with winding directions opposite to those for the blind 48. During operation the rollers 49 and 52 have the same circumferential speed as the rollers 6 and 9. In the present embodiment the first and the second blinds each have an aperture, 57 and 58 respectively, in the form of ractangular windows of the same height, each of which can exposure the entire format, one of the small sides 55, 56 of said windows forming an edge of the shutter slit. As a result of this arrangement each blind comprises two half blinds which are interconnected by straps 54. In the same way as in the embodiment shown in FIGS. 1 and 2 the blinds 47 and 48 shown in FIG. 3 are preferably made of stainless steel or titanium having a thickness of approximately 25 microns. Their rigidity is such that they are resiliently loaded relative to the rollers on which they are arranged (with a different capacity of the rollers 6 and 49 or 9 and 52), so that the blinds can always be taut even in the case of a variation of the diameter of the rollers owing to the different length of blind which they contain. It is to be noted that in FIG. 3 the edges 55 and 56 of the shutter slit have been reversed relative to those shown in FIGS. 1 and 2, the edge 55 of the first blind 47 being situated at the side of the angular-positioning device and the edge 56 of the second blind being situated at the side of the drive mechanism. This reversal is allowed because each blind has an aperture.

Figure 4:
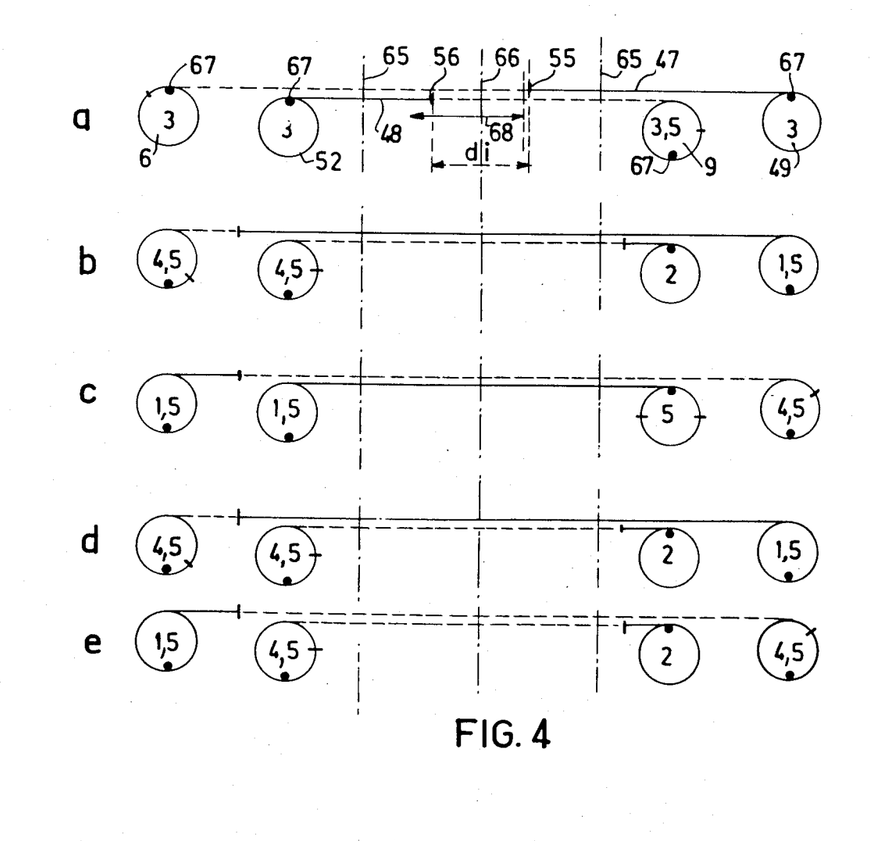
FIG. 4 is a diagram illustrating the various stages of operation of the embodiment of the invention shown in FIG. 3.

The angular-positioning device with the reference numeral 59 in FIG. 3 may be the same as that shown in FIGS. 1 and 2. However, owing to the special construction of the blinds, the blind drive and the blind-tension means as described in the foregoing, the angular-positioning device may be modified so as to enable time exposures by means of a suitable control. In the device 59 the first drum 60 carries the pinion 51 in addition to the pinion 11 and comprises one or more slots 70. The second drum 61 is longer than the drum 60 and the slot(s) 62 which guide(s) the limb(s) 25 change(s) into a cylinder generatrix 61 towards the back of the Figure. This allows the lower blind 48 to be uncoupled, which happens when the limbs 25 are disengaged from the slots 70. In order to set the shutter to time exposures the shutter slit must be disposed as close as possible to the drive mechanism, the drums 60 and 61 still being interlocked by means of the limbs 25, in such a way that the aperture 57 of the lower blind exposes the entire format and the aperture 58 of the upper blind fully covers the latter. In this particular position, in which the pin 35 is situated substantially in its extremely left-hand position in the Figure, the limbs 25 are disengaged from the drum 60 by depressing of the spindle 23. In order to ensure that the blind 48 is held in this last-mentioned position in a stable manner so that it is immune to shocks or vibrations, the member 24 is pushed towards the back by means of the spindle 23 so that it is pressed against the inner bearing ring, which is secured to the chassis and thus immobile, of the drum 61. Thus, the shutter can be operated to make exposures with an unlimited exposure time by means of the upper blind 47 only. This mode of operation resembles that of commercially-available conventional cameras with a single shutter blind. In this special mode of operation one complete cycle of the drive mechanism is necessary (i.e. one full revolution of the pinion 34), so that the film must be advanced only once instead of twice during this cycle: before a time exposure the upper blind covers the entire format (the blind 47 being pulled completely to the left, see FIG. 4d). The exposure time begins when the shutter is released by means of the electric motor and the upper blind is pulled to the right after which the electric motor stops (in this last-mentioned position the entire format is exposed—see FIG. 4e). After an electronically obtained delay equal to the exposure time, the motor is re-energized and the blind 47 moves across the format in the reverse direction to its initial position where the motor is stopped for the second time (see FIG. 4d) in which position it remains until the next exposure is taken. From the position shown in FIG. 4d change-over 10 instantaneous exposures is effected by pulling out the spindle 23, so that the drums 60 and 61 are interlocked again. In order to facilitate the insertion of the limbs 25 into the slots 70, said slots are suitably formed with a widened portion 63 at their open ends (FIG. 3).

As will be described hereinafter with reference to FIG. 5, the spindle 23 may be passed through the bearing of the drum 61 with a sliding fit and on the other side of said bearing it may actuate a potentiometer by means of a mechanism resembling the mechanism 59, the output voltage V of this potentiometer corresponding to the dimension d (or the exposure time T).

FIGS. 4a, b, c, d and e illustrate different stages of operation of the embodiment shown in FIG. 3, the mode of operation illustrated by means of FIGS. 4a, b and c being also possible with the embodiments shown in FIGS. 1 and 2 which comprise a single drive roller per blind (6 and 9 respectively). At the right of the Figures the corresponding position of the control spindle 35 in the slot 36 is shown. The format of the camera is indicated by the two dash-dot lines 65, the middle of the format being indicated by the dash-dot line 66. On each side of the format the drive rollers for the blinds are shown, 6 and 49 on one side and 9 and 51 on the other side. The line of attachment of the blinds to the rollers is symbolically represented by a point 67 on the circle representing each roller and the figure inside each circle indicates the number of turns of each blind around the rollers for a specific choice of the point of attachment of the blinds to the rollers, which choice is arbitrary with the proviso that a minimum take-up length is observed for each roller. In FIG. 4a a double arrow 68 indicates the control range attainable for the width d of the shutter slit, which may vary between, for example, d min=1.75 mm (T=1/3200 s) and d max=22.4 mm (T=1/250 s). In FIG. 4a an intermediate value di has been chosen for the slit width d. FIG. 4a shows the shutter position when the actuating spring 31 is not loaded and the spindle is situated at one of the ends of the slot 36. FIG. 4b shows the system for the same slit width di, pulled towards the left by means of the spindle 35 which is disposed in its extreme left-hand position, ready for release. Between the positions shown in FIGS. 4b and 4c the shutter is released, the shutter slit scanning the format from the left to the right with a substantially constant high speed, the shutter slit stops briefly at the right outside the format, during which the change to another exposure is effected, and subsequently proceeds with its movement to the right under the influence of the electric motor and the spindle 35 until it has reached the position shown in FIG. 4c. The next exposure corresponds to the passage from position 4c to position 4b, the operation being the reverse of the sequence described above. FIGS. 4d and 4e illustrate a time exposure. The starting position in which the drum 61 is disengaged is indicated in FIG. 4d, which position is the same as that shown in FIG. 4b. The change from position 4d to the position 4e proceeds as described for the passage from 4b to 4c for the upper blind. During this transition the lower blind 48 remains stationary so that in position 4e the entire format is exposed. At the end of the exposure in position 4e the electric motor is reenergized and the blinds 47 and 48 return to position 4d (or 4b if the spindle 23 has been pulled).

Figure 5:
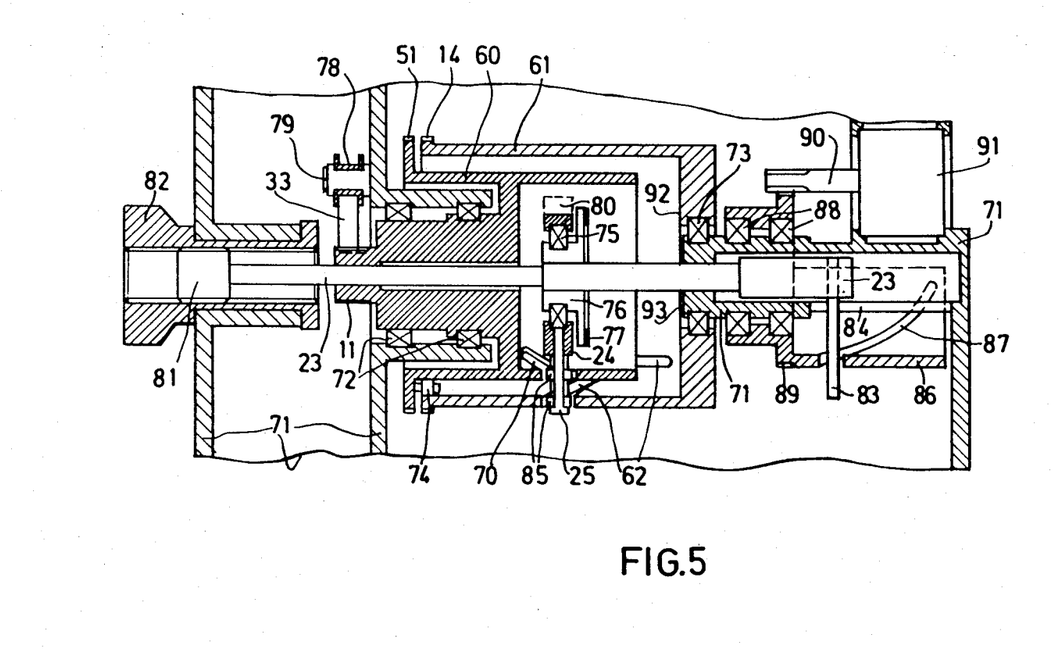
FIG. 5 is a detailed sectional view of an angular positioning device used in an embodiment of the invention.

FIG. 5 shows how the angular-positioning device 59 of FIG. 3 may be constructed. To simplify the Figure certain parts are represented as a single part, although in practice they comprise a plurality of separate components, which is necessary for mounting them, the separate parts being fixed to each other by any known means after assembly. This is in particular so for the bearing supports. The chassis bears the reference numeral 71 and the various parts indicated by reference numerals in FIG. 3 are also shown, namely the second pinion 11, the third pinion 14, the drums 60 and 61 with their slots 70 and 62 respectively, the spindle 23, the member 24 which carries the limb(s) 25, the gear rack 33 and the pinion 51. The drum 60 is mounted for rotation on the chassis by means of a bearing 72 and, on the opposite side, the drum 61 by means of a bearing 73. The drum 61 is rotatable relative to the drum 60 via at least three rollers 64 whose spindles are supported by the drum 60. By means of a bearing 75 the member 24 is rotatable around a member 76, which is clamped on the spindle 23 and which is rigidly connected to a brake pad 77. A toothed end-portion of the gear rack 63 is enclosed between the pinion 11 and a roller which has a flat-bottom groove 78 and which is mounted for rotation on a spindle 79 which is rigidly connected to the chassis. An end portion 81 of the spindle 23 is threaded and engages a threaded bush 82 which is supported by the chassis via a sleeve bearing; when the bush 82 is rotated this construction ensures that the spindle 23 is advanced or with-drawn and thus the assembly comprising the elements 24, 25, 75, 76, 77 inside the drums 60 and 61, if rotation of the spindle 23 is inhibited. Rotation is inhibited by means of a limb 83 which is fixed perpendicularly to the other end of the spindle 23 and which engages a straight slot 84 in the chassis. In order to obtain a sufficiently rapid movement of the spindle 23 the threaded end portion 81 may be provided with multiple thread. The bush 82 may be actuated manually or by means of an electronically controlled electric motor. It is even possible to vary the slit width d in accordance with any desired function of time during the shutter-release stage. In particular during the time interval in which the slit travels across the image to be recorded its speed v(t) is not entirely constant but, in particular if the drive mechanism is a spring, it increases from the beginning to the middle of this time interval and then decreases from the middle towards the end in accordance with a relationship which can be determined with a suitable accuracy by experiment. Thus, in accordance with the invention it is possible to impose a variation d(t) on the dimension d during said time interval, which variation is for example proportional to the variation v(t) (similar functions of time—see formula 2) in such a way that by virtue of fomula (1) a predetermined constant exposure time T is obtained during the entire time in which the slit travels across the image (the slit becomes wider when it has passed the centre line 66 of the format—FIG. 4).

In FIG. 5 a dashed-line rectangle 80 symbolically represents the presence of further limbs 25 which cooperate with further slots 70, 62 formed in the drums 60 and 61. Preferably, the limbs 25 comprise rotary rings 85 to facilitate their movement in the slots. When the limbs 25 are disengaged from the slot 70 upon depression of the spindle 23 the drum 61 is no longer interlocked with the drum 60. A slight additional depression brings the braking disc 77 into contact with the bottom 92 of the drum 61, so that said drum is stopped because the disc 77 itself cannot rotate as a result of the presence of the limb 83. Alternatively, as described above with reference to FIG. 3, the braking disc may be rigidly connected to the member 24 and act against the surface 93 of the chassis, which surface extends substantially in the same plane as the surface 92.

In a manner not shown the maximum depression of the spindle 23 mechanically actuates a mechanical or electro-mechanical control which serves to inhibit one of every two film-transport sequences during a complete cycle of operation of the driving mechanism, which precludes that during time exposures one half of the photosensitive surface of the film to be exposed is spoilt.

In the right-hand part of FIG. 5 on the other side of the bearing 73 a mechanism is shown which is controlled by the translational position of the spindle 23, which mechanism is capable of converting the instantaneous value of the slit width d into an electrical value. This mechanism comprises a cylindrical sector 86 which is provided with a curved slot 87 and which is mounted for rotation on the chassis by means of bearings 88. The limb 83 extends in the slot 87 and the sector 86 is provided with a pinion 89 mounted on the spindle 90 of a potentiometer. The translational movement of the limb 83 causes a rotation of the spindle 90 in accordance with the curvature of the slot 87. If V is the output voltage of the potentiometer 90 it is thus possible to obtain the required transfer function between the parameters d and V or T and V. The output signal of the potentiometer (the voltage V) may be used for indicating the exposure time value on a display and/or for recording purposes, or it may be used as a transducer output for controlling the film exposure in conjunction with an aperture control with a preset exposure time or with an exposure time which can be varied independently or together with the aperture.

The principle advantages of the shutter described above are the following:

alternate operation in the one or the other scanning direction, so that a rapid sequence of exposures can be made (up to ten exposures per second);

if the drive mechanism is a spring energy recovery, which saves drive-motor energy (by means of a single spring);

full control of the slit width both when stationary and during operation, which results in extremely small slits (down to 1 mm) and consequently vary short exposure times (variable and accurate exposure times up to 1/4000 s);

variation of the slit width is possible during the movement of the blinds;

in the embodiment comprising four blind-drive rollers a simple control (same actuating button as for the slit width) of time exposures (night photography with flare);

the blinds exert no or a small load on the rollers in a radial direction (as in certain cameras), so that the blinds can be made of light alloys and the rotary mass of the rollers can be low, which yields a gain in speed and saves energy.

What is claimed is:

1. A photographic shutter of the focal-plane type, comprising a first and a second blind which extend in parallel planes close to each other and which are partly wound on respective drive rollers which are situated on one side and on an other side of an exposure window, respectively, and which are mounted for rotation on a chassis, each of the first and the second blinds having an edge which is movable across the exposure window so that a shutter slit is formed between said edges, the drive roller of the first blind being drivable directly by a first pinion which is rotatably coupled to a drive mechanism mounted on said chassis, characterized by further comprising a second pinion which is mounted for rotation on said chassis, the second pinion being arranged opposite the first pinion on the other side of the exposure window, the second pinion being rotatably coupled to said first pinion by means of a mechanical connection arranged such that, at any instant, a relative position of the blinds can be obtained which defines a shutter slit of a predetermined width, a third pinion which is coaxial with the second pinion and which is drivable by said second pinion via an angular-positioning device which is coaxial with the second and the third pinions, the angular positioning device being constructed and arranged for movement which is independent of simultaneous rotary movements of the second and the third pinions, so that the third pinion can drive said drive roller of said second blind with a speed of rotation equal to that of the drive roller of the first blind, and tension means for maintaining each blind in its respective plane.

2. A photographic shutter as claimed in claim 1, characterized in that said tension means comprises a third drive roller which is mounted for rotatable on the chassis and which is rotatated by said second pinion and a fourth roller which is mounted for rotation on the chassis near said drive mechanism and which is drivable by a tension band which is wound around the rollers carrying the second blind with winding directions opposite to those of the second blind, and said first and second blinds each have a rectangular aperture which is capable of exposing an entire format, one of the small sides of said aperture forming an edge of the shutter slit.

3. A photographic shutter as claimed in claim 2, characterized in that one edge of the shutter slit is formed by the edge of the aperture of the second blind nearest said drive mechanism, the other edge of the slit being formed by the edge of the aperture of the first blind which is situated at the side which is remote from said drive mechanism, so that said edges can overlap each other to obtain a range of angular displacement values dictated by said angular-positioning device.

4. A photographic shutter as claimed in claim 1, 2 or 3, characterized in that said drive mechanism is an electronically controlled electric motor.

5. A photographic shutter as claimed in claim 1, 2 or 3, characterized in that said drive mechanism is a helical spring with non-adjoining turns, the spring being loaded torsionally in at least one direction of rotation.

6. A photographic shutter as claimed in claim 5, in which said spring is loaded torsionally in both directions of rotation, characterized in that it provides energy recovery in one of the two directions of travel of the shutters across an image to be recorded and comprises a gear rack which is supported by rollers mounted for rotation on the chassis, said gear rack providing a rotary coupling between said first pinion and said second pinion and being provided, between said first and said second pinions, with a cam device which is rigidly connected to a pinion with an anti-return pall which is controlled by means of an energy-supply and release mechanism.

7. A photographic shutter as claimed in claims 1, 2 or 3, characterized in that said angular-positioning device comprises a first and a second concentrically arranged drum, which drums are mounted for rotation on said chassis, a spindle, and at least one limb, which first drum is rigidly connected to said second pinion and which second drum is rigidly connected to said third pinion, said spindle being coaxial with said second and third pinions in which it can slide freely, said limb being mounted for rotation so that it cannot be translated on said spindle inside said drums and engaging a first and a second curved slot formed in the walls of the first and the second drum, respectively, which slots are curved oppositely, an angular displacement between said second and third pinions being a function of a translational position of said spindle along its axis.

8. A photographic shutter as claimed in claim 7, characterized in that the translational position of the spindle is adjusted by screw-thread means, rotation of said spindle being inhibited by axial sliding movement of a limb which is rigidly connected to said spindle in a part of the chassis, which spindle comprises a threaded end-portion which engages a rotatable threaded bush which is mounted for rotation on the chassis.

9. A photographic shutter as claimed in claim 7, characterized by further comprising a slit-width detection mechanism which comprises a second angular-positioning device comprising a limb on one end of said spindle to which it is rigidly connected, a cylindrical sector provided with a curved slot, and a potentiometer having a rotary wiper, said limb engaging in said slot and said cylindrical sector being rigidly connected to a fourth pinion which is adapted to rotate said rotary wiper.

10. A photographic shutter as claimed in claim 7, characterized in that said second drum is longer than said first drum and its slot extends further than said first drum in accordance with a generatrix of the cylinder formed by the second drum, so that for a range of values corresponding to a deep insertion of said spindle in the drums said limb is disengaged from said first slot so that the two drums are not coupled to each other.

11. A photographic shutter as claimed in claim 10, characterized by further comprising means for immobilizing the second drum, the immobilizating means comprising a brake rigidly connected to the spindle or the limb inside said second drum, the brake being arranged such that the brake can be brought into contact with the outer ring or with the inner ring of the second-drum bearing respectively when the spindle is pressed into the drum to the maximum extent.

12. A photopgrahic shutter as claimed in claim 1, characterized in that said first and second blinds are formed by stainless-steel sheets having a thicknesses of the order of some tens of microns.

13. A photographic shutter as claimed in claim 1, characterized in that said first and second blinds are formed by titanium sheets, having respective thicknesses of the order of some tens of microns.

* * * * *